Jan. 24, 1967   H. E. JACOBY   3,299,942
METHOD AND APPARATUS FOR THE CONCENTRATION OF LIQUIDS
Filed June 29, 1964   2 Sheets-Sheet 1
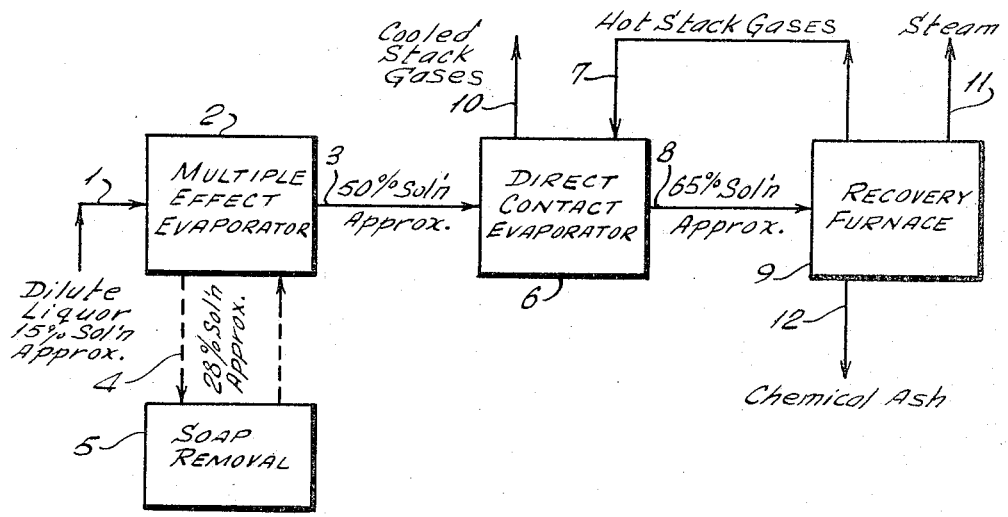
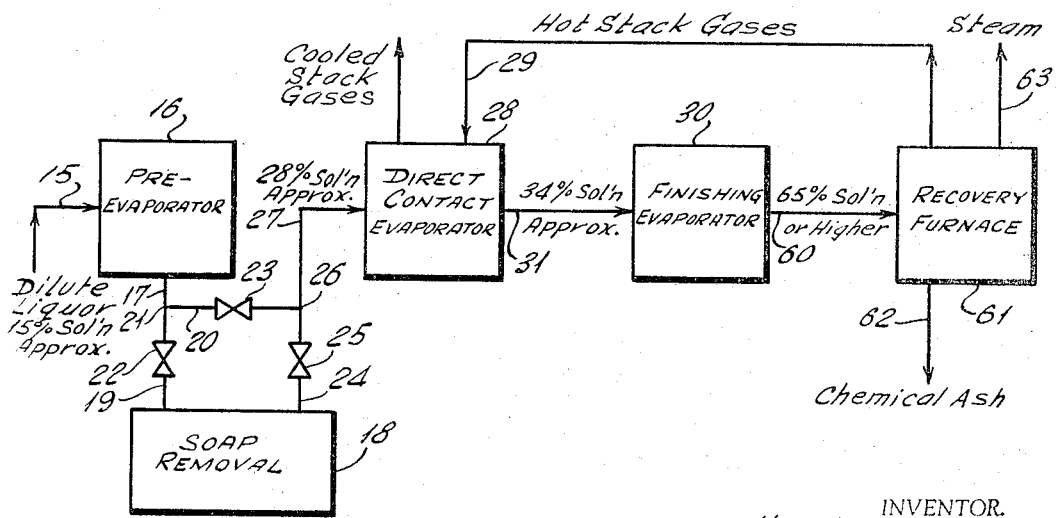
INVENTOR.
HAROLD E. JACOBY
BY Albert M. Parker
ATTORNEY

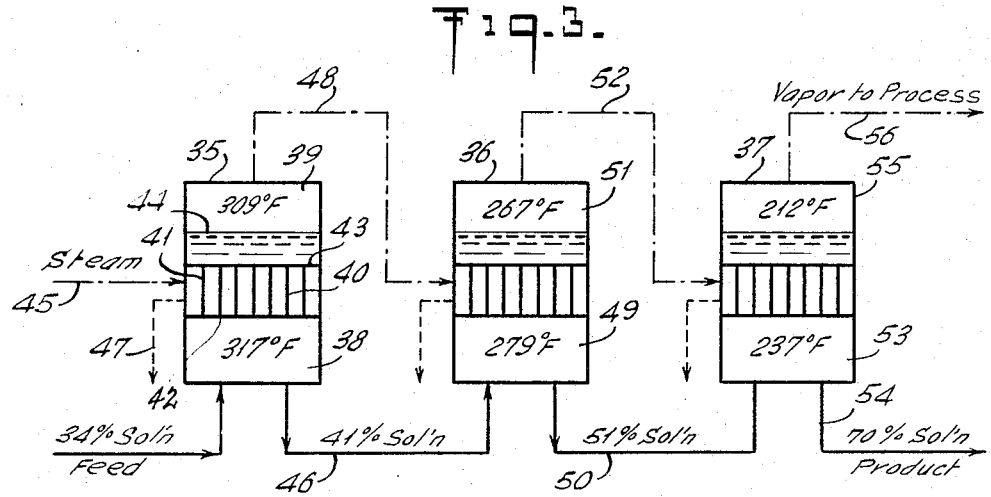
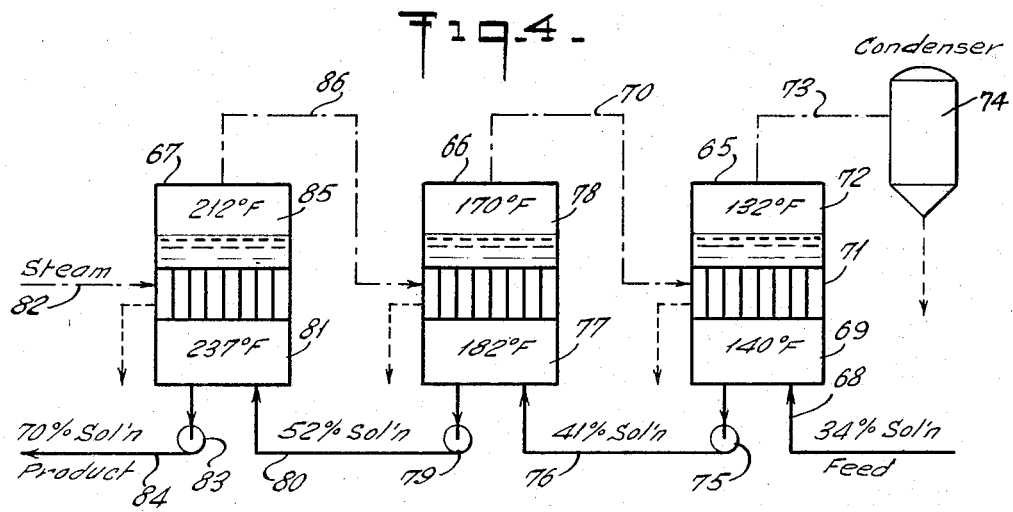
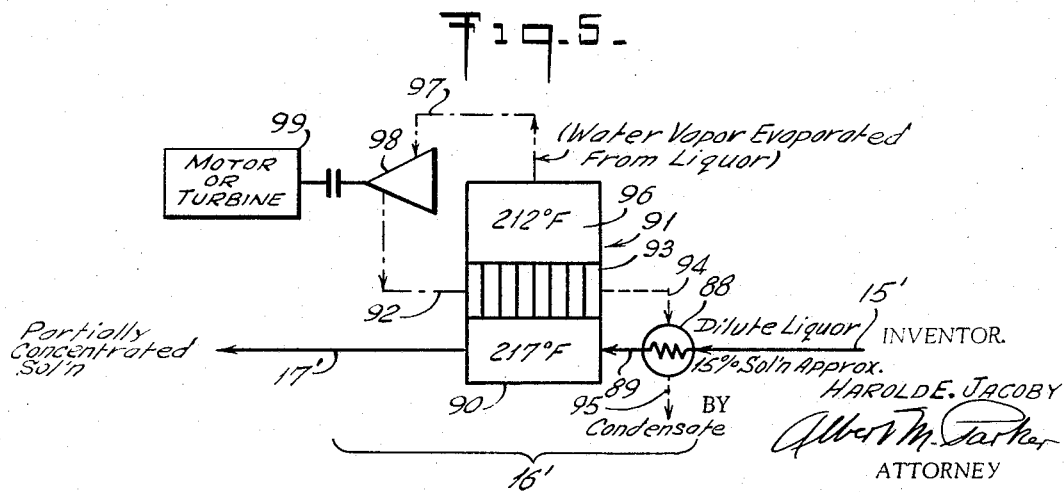

United States Patent Office 3,299,942
Patented Jan. 24, 1967

3,299,942
METHOD AND APPARATUS FOR THE
CONCENTRATION OF LIQUIDS
Harold E. Jacoby, % Jacoby Process Equipment Co., Inc.,
97 Shepherds Lane, Roslyn Heights, N.Y. 11577
Filed June 29, 1964, Ser. No. 378,520
7 Claims. (Cl. 159—17)

This invention relates to the concentration of solutions for the heat and chemical recovery of components from the concentrated product. In particular, the invention is concerned with methods and apparatus involved in such concentration and the arrangement of the steps-therein whereby concentration and/or chemical recovery to even a higher degree than that heretofore achieved can be attained in improved and more economical manner.

Considering for the purposes of illustration the practice of evaporating spent cooking liquor in alkaline pulping to recover the heat content thereof by burning the liquor, when concentrated, in a recovery furnace, and for recovering usable chemicals from residual ash, it has heretofore been the practice to initially concentrate the liquor in a multiple effect evaporator. The concentrated solution resulting from such an indirect evaporator system is then introduced into a direct contact evaporator where it is brought into contact with hot, stack gases from the recovery furnace employed in the next step. The solution further concentrated in this manner is then introduced into the recovery furnace where it is burned, providing hot stack gases for the previous direct contact step, the furnace boiler providing steam as may be desired for indirect evaporation, and producing the chemical ash which can be used in the making up of new cooking liquor. This prior art arrangement, however, leaves considerable to be desired and involves excessive expenditure of power while the direct contact evaporation involved takes place at low heat economy. Furthermore, the direct contact evaporation in accordance with the prior art takes place after the solution has been concentrated to substantial extent. Thus the hot stack gases are brought into contact with such a concentrated solution. This introduces the recognized drawback that such solutions, particularly organics, tend to be broken down at elevated temperatures, such as those of furnace flue gases.

The prior art system also is quite inflexible in that final temperature at final concentration cannot be varied to any appreciable extent where the final concentration is effected by direct contact with hot stack gases. The foregoing and other drawbacks of the prior art practices are overcome by the instant invention which additionally adds improvements going well beyond anything contemplated in the prior art.

In the invention system dilute liquor is initially concentrated to a partial extent by means of a single, or multiple, effect or vapor recompression evaporation, still leaving a solution considerably more dilute than that resulting from the multiple effect evaporation of the prior art. This allows a nicety of control not present in the prior art practices. Applying recompression to a certain extent at an initial dilute stage largely overcomes the limiting effects of boiling point elevation, which effect increases with increase in concentration of the liquid. Having terminated this initial step before efficiency is noticeably impaired, the resultant still relatively dilute solution, in contrast with the prior art practices, is brought into direct contact with the hot stack gases for direct contact evaporation. By so doing the practice of the invention achieves material gain over anything heretofore attempted.

In the first place, the dilute or partially concentrated liquor of the invention is superior as a scrubbing medium for flue gases to the concentrated liquor of the prior art. Flue gases carry with them a portion of the chemical ash resulting from the combustion of concentrated liquor. This ash must be recovered for its chemical value to prevent air pollution. Hence, a superior scrubbing medium is important. When scrubbing such soluble dusts, a solution containing a larger proportion of solvent (dilute solution) will be more effective than one with lesser proportion of solvent (concentrated solution). Furthermore, the need to employ operating utilities at this stage is materially reduced as against prior art practices. This result follows because reduced power requirement is a function of reduced concentration. Then, as already pointed out, the only partially concentrated liquor is considerably less subject to breakdown at elevated temperatures than are the concentrated solutions of the prior art. In the invention, also, the partially concentrated liquor is at the concentration desirable for optimum soap removal so it can be removed from the initial indirect operating evaporator and on leaving the soap removal system can be introduced right into the direct contact evaporator before being sent to the finishing evaporator. The soap removal system can be either wholly or partially bypassed by the liquor flow as desired.

The partially concentrated liquor leaves the direct contact evaporator of the invention further concentrated to a moderate extent, and then is introduced into the finishing evaporaor for final concentration prior to introduction into the recovery furnace. This final evaporation may be by way of single or multiple effect evaporation, or may be vapor recompression, or may be various combinations thereof depending upon the requirements. Here additional economy may be achieved in the use of steam or other energy since the liquor may be concentrated to the same or to a higher degree than is possible in the prior art before introducing the finally concentrated solution into the recovery furnace for burning.

It is, accordingly, the principal object of the invention to provide for the concentrating of solutions, for recovery of heat and chemicals by the burning of the same, in a new and improved manner.

Another object is to provide apparatus for carrying out such method by inter-relating components of the system in a new and improved manner.

Another object is to make more effective use of direct contact evaporation in such recovery systems than has heretofore been done.

Still another object is to improve upon the control over the steps in the concentration of liquor for heat and chemical recovery.

A further object is to economize upon the power requirements in a system for such liquor concentration.

A still further object is to improve upon the scrubbing action exerted upon the hot stack gases employed in such liquor concentration for improved chemical recovery.

Another object of the invention is the provision of a novel apparatus and method which provide concentrated liquor to the furnace at better controlled and/or higher controlled temperatures than are obtainable from prior direct control evaporators.

Yet another object is the provision of an apparatus and a method of the type indicated which prevent chemical breakdown of liquor which was formerly experienced in prior direct contact evaporators.

A still further object is the provision of apparatus of the type described which display increased economy in the consumption of heating medium such as steam.

Further and more detailed objects will in part be obvious and in part be pointed out as the description of the invention taken in conjunction with the accompanying drawing proceeds.

In the drawing:

FIG. 1 is a diagrammatic showing of a flow sheet in accordance with a conventional prior art system for the concentration of dilute liquor for the recovery of heat and chemicals therefrom by burning;

FIG. 2 is a similar view of a flow sheet in accordance with the invention;

FIG. 3 is an illustrative diagrammatic showing of a triple effect pressure evaporator usable in accordance with the invention;

FIG. 4 is a similar view illustrating an alternative vacuum evaporator; and

FIG. 5 is an illustrative diagrammatic showing of a recompression evaporator for a pre-evaporator usable in accordance with the invention.

Considering first the method and system of the prior are illustrated in FIG. 1 as applied to the concentration of spent liquor in dilute solution resulting from an alkaline pulping operation, it is seen that that liquor is provided through conduit 1 in a solution of approximately 15% solids. This dilute liquor is introduced into a multiple effect evaporator, illustrated at 2, which evaporates the liquor by heat transfer across a heating surface. It is there concentrated to a solution of approximately 50% solids, which solution flows out through the outlet line 3. For optimum soap removal according to this system it is necessary to remove partially concentrated liquor from the evaporator 2 at an intermediate evaporation stage through the conduit 4. After passing the same through the soap removal system 5 that liquor is returned to an intermediate stage of the multiple effect evaporator for further concentration.

Following the flow sheet of the prior art system along further, it is next seen that the approximately 50% solution is introduced into the direct contact evaporator 6 where it is brought into contact with hot stack gases introduced through the conduit 7. This direct contact of hot gases with liquor results in further evaporation, increasing the concentration of the liquor to approximately 65%. The liquor so concentrated flows out through the conduit 8 and is burned in the recovery furnace 9. It is this recovery furnace from which hot stack gases are returned through the conduit 7 into the direct contact evaporator 6. The cooled stack gases resulting from the direct evaporation flow away through the conduit 10. From the recovery furnace 9 steam is taken off through the conduit 11 for utilization where desired, while chemical ashes are recovered at 12 for use in the make up of new cooking liquor.

The operation of the direct contact evaporator to effect the final concentration of liquor, as shown by this prior art flow sheet, requires considerable operating utilities, such as power, where an already concentrated solution is being further concentrated by direct contact with the hot flue gases. Actually there is a limit to which liquor can be concentrated in direct contact evaporation in spite of the substantial power employed to effect this evaporation at this stage. Chemical decomposition of liquor can occur in such direct contact evaporation, thus making it necessary to take what one can get rather than being able to get what one wants. Equally important, as already pointed out, when flue gases are scrubbed by direct contact with already concentrated liquor there is a decrease in chemical recovery as compared with the results obtainable from the same gases when using more dilute liquor.

The method and system of the invention eliminate a number of the prior art drawbacks and introduce a flexibility into the concentration of liquor for heat and chemical recovery which enables the attainment of improved results in a more economical manner and in a manner which enables free selection of results to be effected. In a sense, the invention achieves its improved results by splitting the concentrating of the liquor by means of multiple effect or vapor recompression evaporation or combinations thereof into a pre-evaporation stage and a finishing evaporation stage and carrying out direct contact evaporation between those two stages. Direct contact evaporation is accordingly employed at a position where it is most effective, produces the best results and takes the least power to operate it.

Turning then to the flow sheet of the invention, as seen in FIG. 2, it is seen that dilute or spent liquor of approximately 15% solution to be concentrated is first introduced through the conduit 15 into a pre-evaporator 16. This may be of single or multiple effect, or vapor recompression type of evaporator, or various combinations of these types. Advantageously, evaporation of the liquor in the pre-evaporator 16 may be carried to the point where the concentration of the solution is appropriate for optimum soap removal. Thus, liquor concentrated in this pre-evaporation is taken out through a conduit 17 from which it may be passed either wholly, or partially, through the soap removal stage indicated at 18.

Control as to whether the whole, only a part, or none of the initially concentrated liquor is passed through the soap removal stage is effected by the conduit arrangement whereby the outlet conduit 17 is spread into two branches 19 and 20 at the junction 21. There is a valve 22 in the branch 19 and a valve 23 in the branch 20. Thus if the valve 23 is fully closed and valve 22 is open, all of the liquor can flow into the soap removal stage 18. Here must also be taken into consideration the outflow conduit 24 from the soap removal stage which has a valve 25 in it in advance of the junction 26 of the conduit 24 with the remote end of the branch 20. From the junction 26 a common conduit 27 leads to the direct contact evaporator 28.

For liquor to flow to and through the soap removal stage 18 the valve 25 would, of course, have to be open. However, if the valves 22 and 25 are fully closed and the valve 23 is fully open, then all of the partially concentrated liquor will flow through the branch 20 directly to the common conduit 27 and thus on into the direct contact evaporator 28. Alternatively, the valves 22 and 23 may be adjusted, as may the valve 25, so that partial flow through the soap removal stage 18 is achieved while part of the flow is bypassed through the branch 18 to the common conduit 27. Here it is to be noted that the partially concentrated liquor is not drawn off from the pre-evaporator 16 until the evaporation action has proceeded sufficiently to produce a solution concentration for maximum soap production (usually approximately 28% solution). Accordingly, it is not necessary, as in the prior art, to reintroduce even that portion of it which has been subjected to soap removal back into the initial evaporator for further evaporation before going to the direct contact evaporator. Instead, liquor at approximately 28% concentration, either directly from the pre-evaporator 16 or from the soap removal stage 18, or both, is introduced into the direct contact evaporator 28. In the evaporator 28 this relatively dilute liquor as contrasted with concentrated liquor of prior art practices, is brought into direct contact with hot stack gases introduced into the evaporator 28 through the conduit 29 and coming from the recovery furnace.

The bringing of the partially concentrated, relatively dilute liquor into direct contact with the hot stack gases creates various advantages for the method and system of the invention as against that of the prior art. There is great power saving in the operation of the direct contact evaporator when relatively dilute liquor rather than a concentrated solution is to be evaporated. Relatively dilute liquor serves as a superior scrubbing medium for the flue gases extracting from them the material which it is desired to recover for use in making up fresh cooking liquor. Furthermore, the relatively dilute solution is less subject to breakdown at the elevated temperature of the furnace flue gases. In the direct contact evaporator as here illustrated the solution is concentrated from approximately 28% to approximately 34% and is then subjected to the action of the finishing evaporator 30 to which it flows through the conduit 31.

Further virtues of the invention are introduced at this stage for an understanding of which reference is made to FIGS. 3 and 4. These illustrate somewhat diagrammatically evaporators which may be employed as the finishing evaporator illustrated at 30 in FIG. 2. FIG. 3 shows a pressure evaporator wherein high pressure steam is used to generate low pressure steam for use elsewhere in the process. FIG. 4 shows a vacuum evaporator using low pressure steam and a condenser. Either the evaporator of FIG. 3 or that of FIG. 4 can be used in the system of the present invention.

Considering first the pressure evaporator of FIG. 3, such evaporator is shown as having three effects 35, 36, and 37, though it is to be understood that the showing of this number of effects is merely for illustrative purposes; it is to be understood that a greater number or smaller number can be employed if desired. In any event evaporation in this manner and at this stage economizes on the use of steam and/or energy, and enables final temperature at final concentration to be varied at will by varying the flow arrangement and the temperature level of the heating medium employed.

In the triple effect evaporator of FIG. 3, corresponding to that which is designated 30 in FIG. 2, the solution concentrated to 34% as it comes from the direct contact evaporator is introduced into the lower portion of the boiler-like device of the evaporator. This device in the form of a closed vessel, has lower and upper chambers 38 and 39 whose interiors are put into communication through a intermediate tube bundle 40 passing up through an isolated intermediate chamber 41 bordered by upper and lower tube sheets or headers 42 and 43. The level of the liquor in the evaporator 35 is shown at 44 in the upper chamber 39 just above the header 43 while the remaining space in the upper chamber 39 is occupied by vapor.

Live steam at a temperature of 347° and a pressure of 115 pounds p.s.i. is introduced through the conduit 45 into the chamber 41 and into the space surrounding the bundle of tubes 40. This steam heats the incoming solution to a temperature of 317° F. driving off vapor from it and further concentrating the solution to 41%. The 41% solution is drawn off from the bottom chamber 38 and is introduced through the pipe 46 into the bottom chamber of the next effect 36. In effecting the heating the line steam is condensed and its condensate flows out through the pipe 47.

Vapor at 309° F. formed above the liquid level 44 in the upper chamber 39 of the first effect flows through the conduit 48 to serve as the heating medium in the second effect 36. This vapor takes the place of the live steam introduced into the first effect through the pipe 45. In other respects the operation in the second effect 36 is of the same nature as that in the first effect 35. In the second effect, however, the liquor in the lower chamber 49 is only heated to a temperature of 279° F. while being concentrated to a 51% solution. This solution flows out through the pipe 50 to the third or last effect 37.

The vapor formed in the second effect collects in the upper chamber 51 thereof at a temperature of 267° F. at which temperature it flows out through the conduit 52 to serve as the heating medium in the last effect 37. The 51% solution liquor introduced into the liquor chamber 53 of the last effect is heated thereby and concentrated to a 70% solution which is taken off as the final product through the pipe 54. Vapor given off at 212° F. in the vapor chamber 55 of the last effect flows off through the conduit 56 where its heat is employed in a suitable process operation. From the FIG. 3 showing it is to be noted that without any great expenditure of power or heat the liquor has been concentrated from a 15% to a 70% solution ready for introduction into the recovery furnace. Also it will be readily apparent to those skilled in the art that various adjustments may be made so as to control the final temperature at the final concentration merely by varying the flow arrangement and alternatively, or as well, the temperature level of the initial heating medium for the evaporator.

In the FIG. 2 showing the solution coming from the finishing evaporator 30 through the conduit 60 to the recovery furnace 61 is indicated as being at a concentration of 65% or higher. The manner of obtaining a higher concentration solution such as 70% would be obtained by employing the pressure evaporator of FIG. 3 or the vacuum evaporator of FIG. 4 as the finishing evaporator 30. From the recovery furnace 61 chemical ash is taken off at 62 for use in the makeup of new cooking liquor. Steam flows off through the conduit 63 for use where it is needed in related process steps.

The alternative of a vacuum evaporator for use as the finishing evaporator 30 is illustrated in FIG. 4, where the evaporator is generally indicated as a triple stage counterflow system. Here the flow of liquid and vapor are shown in countercurrent relationship with the feed entering at the right hand end as seen in the figure while the live steam is introduced at the left hand end. Basically these effects are structurally very similar to those of FIG. 3, so it is not necessary to repeat the description thereof.

The feed at a concentration of approximately 34% is introduced at 68 into the lower chamber 69 of the third effect 65 and is heated to 140° F. by means of vapor from the second effect 66, which vapor flows through the pipe 70 and about the tubes in the intermediate chamber 71 containing liquor. Vapor at 132° F. given off from the surface of the liquor in the vapor chamber 72 flows out through the pipe 73 into a condenser 74 where its heat content is extracted in the condensing of it.

The liquor in the third effect 65 is heated to 140° F., in the course of which it is concentrated to a concentration of approximately 41%, and is pumped out of the lower chamber 69 by means of the pump 75 which pumps the liquor through the pipe 76 into the lower chamber 77 of the second effect 66. In this effect the liquid is heated to 182° concentrated to 52% solution and gives off vapor in the vapor chamber 78 at a temperature of 170° F. This vapor flows to the right through the pipe 70 and serves as the heating medium for the third effect 65.

Again liquor from the second effect heated to 182° F. and concentrated to 52% is pumped out by means of a pump 79 through the pipe 80 and is pumped into the liquor chamber 81 in the bottom of the first effect 67. Here the liquor is heated by steam introduced through the pipe 82, which steam is at 25 p.s.i. and at a temperature of 267° F. and concentrates the liquor to a final 70% solution the same as in the FIG. 3 form. This 70% solution is then pumped out by means of the pump 83 through the pipe 84 which would take the place of the pipe 60 of FIG. 2 leading into the recovery furnace 61.

In the heating of the liquor in the first effect to concentrate it, vapor is given off at 212° F. in the vapor chamber 85. This vapor serves as the heating medium in the second effect to which it is piped by means of the pipe 86.

From the alternatives of FIGS. 3 and 4, which are illustrative of evaporators that can be employed in the finishing stage of the invention system, the considerable flexibility claimed for this stage of the invention is clearly apparent. Likewise, the pre-evaporation, as illustrated at 16 in FIG. 2, can be carried out in a variety of manners, as for example in the apparatus of FIG. 5, to be described while it is also quite clear the system of the invention has the ability to produce concentrated liquor either above or below atmospheric pressure in order to suit subsequent process requirements and overall plant steam and power balance.

In FIG. 5 there is shown a recompression stage 16' of the pre-evaporator 16 of FIG. 2. This pre-evaporator is made up of a single such unit or a combination of serially connected effects, such as FIGS. 3 and 4 or various combinations of the systems of FIGS. 3, 4 and 5. As there shown, the inlet pipe 15' is connected through a heat exchanger 88 to a pipe 89 leading to the liquor chamber 90 in the bottom of an effect 91; the liquor in such liquor chamber may be, for example, at a temperature of 217° F. Here the liquor is heated by water vapor introduced through a pipe 92 from the discharge of compressor 98 to the sealed exterior of a tube bundle. The condensate from such water vapor is discharged through a pipe 94 leading to the heat exchanger 88, such condensate leaving the heat exchanger through a pipe 95. The aforesaid water vapor is derived from the vapor chamber 96 of effect 91; such vapor, at a temperature of 212° F., is led by a pipe 97 to the inlet of a compressor 98, which is driven by a motor or turbine 99. Partially concentrated solution is discharged from the liquor chamber 90 of effect 91 through the delivery pipe 17'.

It is also possible according to the invention to employ vapor recompression evaporation as alternative to all or part of the pre-, or finishing, evaporation so as to reduce energy to a minimum while accomplishing the necessary evaporation work. However, the phenomenon of boiling point elevation may frequently limit the practical application of recompression. Accordingly, it would normally be desirable to employ recompression on the dilute liquors which have low boiling point elevations. This then would apply to the pre-evaporator, leaving the final concentration in the finishing evaporator to be achieved in single or multiple effect pressure or vacuum fashion as heretofore described.

Though the invention has been illustrated and described from the standpoint of concentrating waste liquor from alkaline pulping, it is of course to be understood that it is not so limited. Furthermore, though various illustrations of manners of proceeding at the various stages have been given, it is to be understood, as has been pointed out, that these are for illustrative and not limiting purposes, and that variations in the type of evaporation or in their conditions of operation may well be adjusted by those skilled in the art to which the invention pertains without departing from the spirit or scope thereof.

Having described my invention, what I claim as new and desire to secure by Letters Patent is:

1. The method of concentrating dilute liquor in order to burn the same in an independent recovery furnace for the recovery of heat and usable chemicals therefrom, which comprises, initially concentrating said dilute liquor to an initial substantially dilute stage in an indirect contact evaporator by heat transfer through a heating surface, thereafter bringing said thus produced initial substantially dilute liquor into direct contact with hot flue gases from said recovery furnace and thereby evaporating said initially concentrated liquor to a further stage of intermediate concentration, thereafter, evaporating in an indirect contact evaporator said thus produced liquor of intermediate concentration in a finishing stage, which follows said stage of intermediate concentration, and on completion of said finishing stage burning said finally concentrated liquor in said independent recovery furnace for the recovery of heat and chemicals therefrom.

2. The method of concentrating dilute liquor for the burning of the same in an independent recovery furnace to recover heat and usable chemicals therefrom, which comprises, evaporating said liquor in a plurality of stages, the first and last of said stages being by indirect contact evaporation and, as an intermediate stage, bringing partially concentrated liquor from said first stage into direct contact with hot flue gases and evaporating and concentrating said liquor by said direct contact ready for introduction into said last stage and obtaining said hot flue gases for said direct contact from said independent recovery furnace.

3. The method of concentrating waste liquor from a chemical pulping process for the burning of the same in an independent recovery furnace to recover heat and usable chemicals therefrom which comprises, initially concentrating said liquor to a moderate extent by heating the same in indirect contact relationship with respect to a heating medium and on completion of said initial concentration bringing said liquor into direct contact with hot flue gases from said recovery furnace thereby concentrating said liquor further by heating the same in direct contact with said flue gases to drive off vapor from the same, and, on completion of said direct contact evaporation, evaporating said liquor further in indirect contact relationship with respect to a heating medium and, thereafter burning said liquor concentrated through said evaporation stages in said independent recovery furnace.

4. The method as claimed in claim 3, wherein said initially concentrated liquor is at a concentration desirable for optimum soap removal.

5. The method as claimed in claim 3, wherein the initially concentrated liquor is at a concentration of approximately 28% solids, the further concentrated liquid resulting from bringing said liquid into direct contact with hot flue gases is at a concentration of approximately 34% solids, and wherein said further evaporated liquid is at a concentration of from approximately 60–70% solids.

6. A system for facilitating the recovery of heat and chemicals from liquor by concentrating said liquor for burning in an independent heat recovery furnace which comprises, in combination, first indirect contact evaporator means for initially concentrating said liquor to a partial extent, means for introducing said liquor into said first indirect contact evaporation means, direct contact evaporation means following in sequence after said first indirect contact evaporation means, means for introducing said partially concentrated liquor into said direct contact evaporation means, and means for introducing hot flue gases into said direct contact evaporation means to further evaporate and concentrate said liquor, and second indirect contact evaporation means following in sequence after said direct contact evaporation means, means for transporting said further concentrated liquor from said direct contact evaporation means to said second indirect contact evaporation means, and means for conducting finally concentrated liquor from said second indirect contact evaporation means to said independent recovery furnace for burning.

7. A system for concentrating dilute liquor for burning in an independent recovery furnace to recover heat and chemicals therefrom, which comprises, in combination, a plurality of evaporation stages connected together in sequence, the first of said evaporation stages being formed to concentrate said liquor to a minor extent in the absence of direct contact with a heating medium, the second of said evaporation stages for receiving said liquor concentrated to a partial extent and concentrating the same to a further extent comprising, a direct contact evaporator, means to introduce said partially concentrated liquor into said direct contact evaporator and means to introduce hot flue gases from said recovery furnace thereinto in direct contact with said liquor therein, the third of said evaporation stages comprising second indirect contact evaporation means, said second indirect contact evaporation means receiving said further concentrated liquor from said direct contact evaporator and means for conducting finally concentrated liquor from said second indirect evaporator to said independent recovery furnace for burning.

References Cited by the Examiner

UNITED STATES PATENTS

| | | | |
|---|---|---|---|
| 1,519,508 | 12/1924 | Richter. | |
| 2,056,266 | 10/1936 | Goodell | 159—4 |
| 2,196,496 | 4/1940 | Hamm | 23—262 |
| 2,936,215 | 5/1960 | Hochmuth | 23—262 X |

NORMAN YUDKOFF, *Primary Examiner.*

J. SOFER, *Assistant Examiner.*